Figure 1:
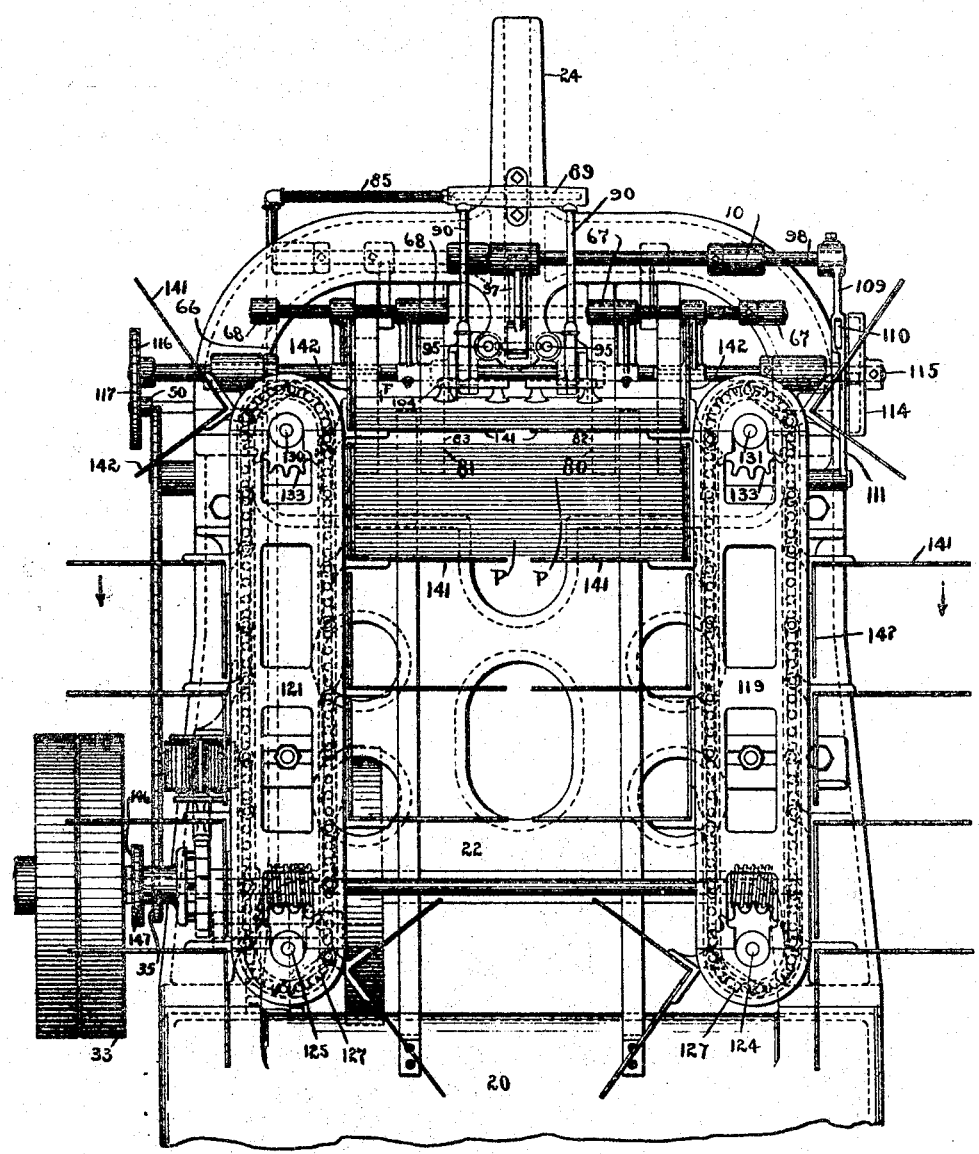

G. L. RICHARDS.
MACHINE FOR FEEDING OFF NEWSPAPERS.
APPLICATION FILED MAR. 1904.

No. 900,782.

Patented Oct. 13, 1908.
8 SHEETS—SHEET 1.

WITNESSES.

INVENTOR.
George L. Richards

G. L. RICHARDS.
MACHINE FOR FEEDING OFF NEWSPAPERS.
APPLICATION FILED MAR. 21, 1904.

900,782.

Patented Oct. 13, 1908.
8 SHEETS—SHEET 4.

WITNESSES.
S. Goostray.
C. S. Miller.

INVENTOR.
George L. Richards
By Henry J. Miller
atty.

G. L. RICHARDS.
MACHINE FOR FEEDING OFF NEWSPAPERS.
APPLICATION FILED MAR. 21, 1904.

900,782.

Patented Oct. 13, 1908.
9 SHEETS—SHEET 6.

WITNESSES
S. Gootray
C. S. Miller

INVENTOR
George L. Richards
By Henry J. Miller
atty

G. L. RICHARDS.
MACHINE FOR FEEDING OFF NEWSPAPERS.
APPLICATION FILED MAR. 21, 1904.

900,782.

Patented Oct. 13, 1908.
6 SHEETS—SHEET 7.

WITNESSES
S. Goodtray.
C. S. Miller

INVENTOR
George L. Richards
By Henry J. Miller
atty.

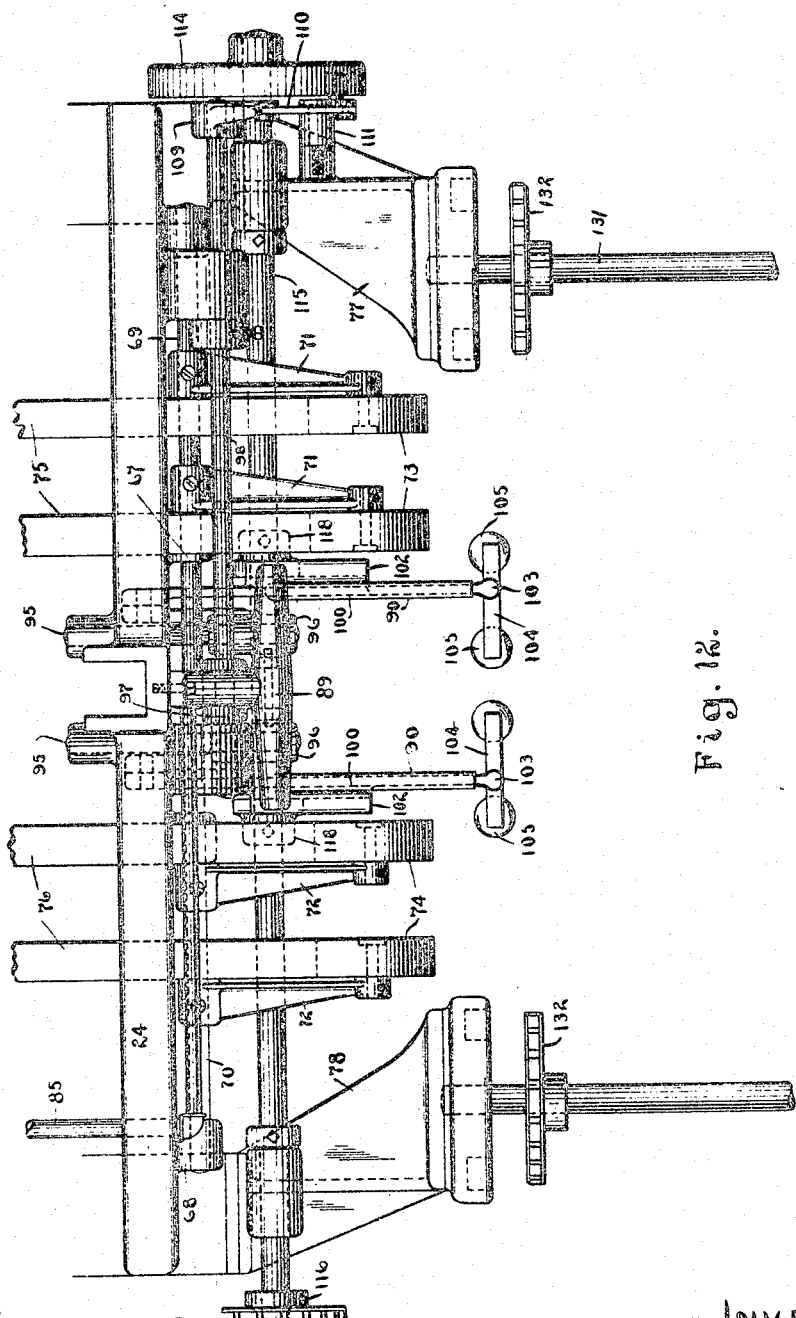

UNITED STATES PATENT OFFICE.

GEORGE L. RICHARDS, OF BROOKLINE, MASSACHUSETTS, ASSIGNOR, BY MESNE ASSIGNMENTS, TO NEILSEN MAILING MACHINERY COMPANY, OF ERIE, PENNSYLVANIA, A CORPORATION OF MAINE.

MACHINE FOR FEEDING OFF NEWSPAPERS.

No. 900,782.      Specification of Letters Patent.      Patented Oct. 13, 1908.

Application filed March 21, 1904. Serial No. 199,150.

*To all whom it may concern:*

Be it known that I, GEORGE L. RICHARDS, a citizen of the United States, residing at Brookline, in the county of Norfolk and State of Massachusetts, have invented certain new and useful Improvements in Machines for Feeding Off Newspapers, of which the following is a specification, reference being had therein to the accompanying drawings.

This invention has reference to improvements in machines for feeding off newspapers, magazines and similar objects from piles thereof, whereby the newspapers, etc., may be periodically fed to mechanism for folding the same and placing a wrapper thereon, or whereby the newspapers or other objects may be otherwise manipulated.

One object of the invention is to so construct a feeding mechanism of this nature that newspapers, magazines, and similar articles may be automatically and accurately fed forward from a lifting or elevating mechanism to a machine adapted to subject such newspapers, etc., to manipulation, and particularly for folding and wrapping such papers or articles.

Another object of the invention is to so construct a machine of this character that the lifting mechanism shall be automatically controlled, as to its movement, by the pressure thereon of an article positioned to be fed.

Another object of the invention is to improve the means for lifting and feeding forward a paper or other article.

Another object of the invention is to improve the construction of the means for elevating the papers or other articles to the path in which they are fed forward.

Another object of the invention is to improve the construction of the suction devices for lifting the papers, etc., and the mechanism by which said devices are given their cycle of motion.

Another object of the invention is to improve the construction of the elevator shelves, the supports for the shelves and the means for driving and guiding said supports.

Other objects will appear from the following description of the construction and operation of the machine.

The invention consists in such novel features of construction and combination of parts as shall hereinafter be more fully described and pointed out in the claims.

Figure 2:
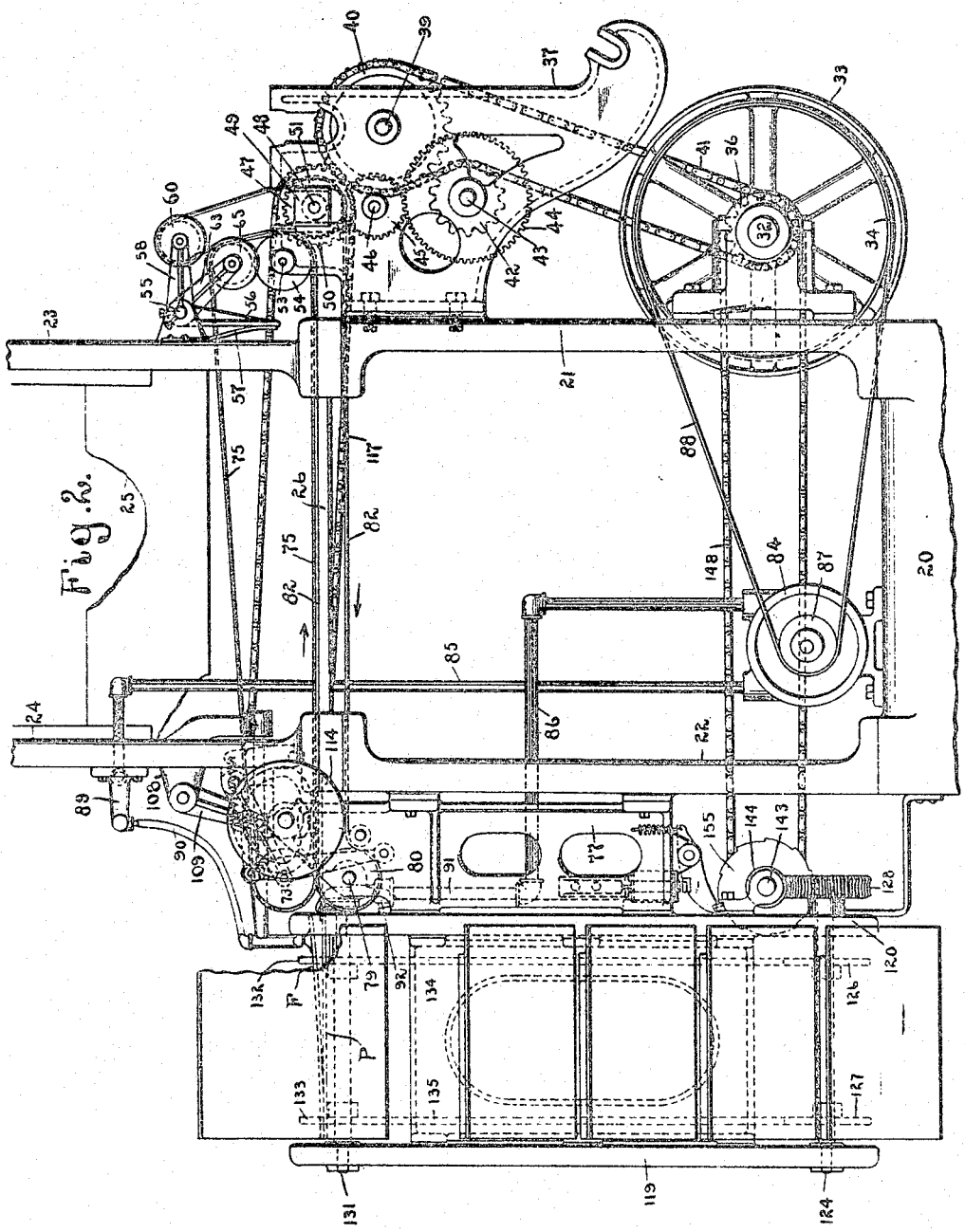
Figure 3:
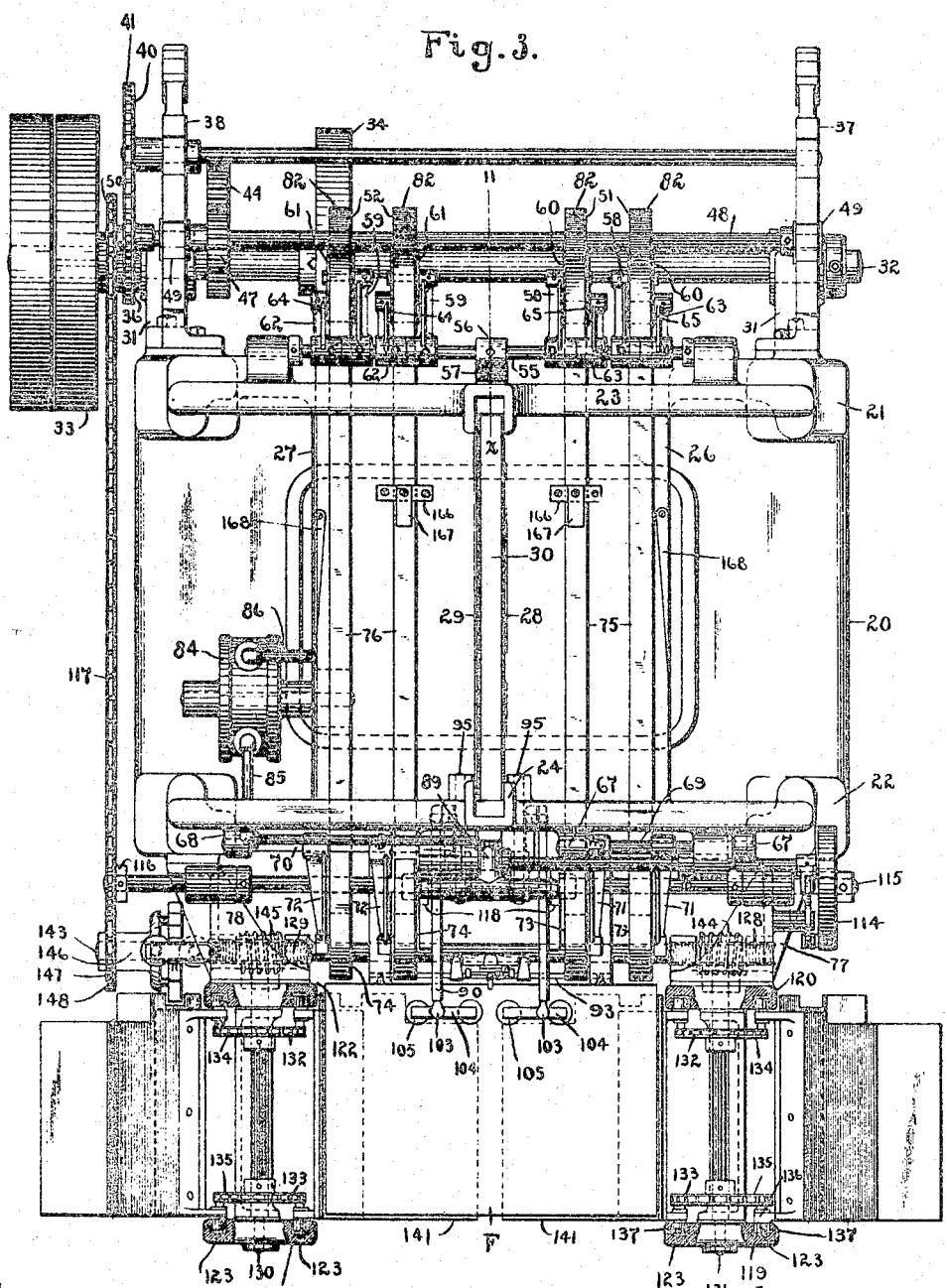
Figure 4:
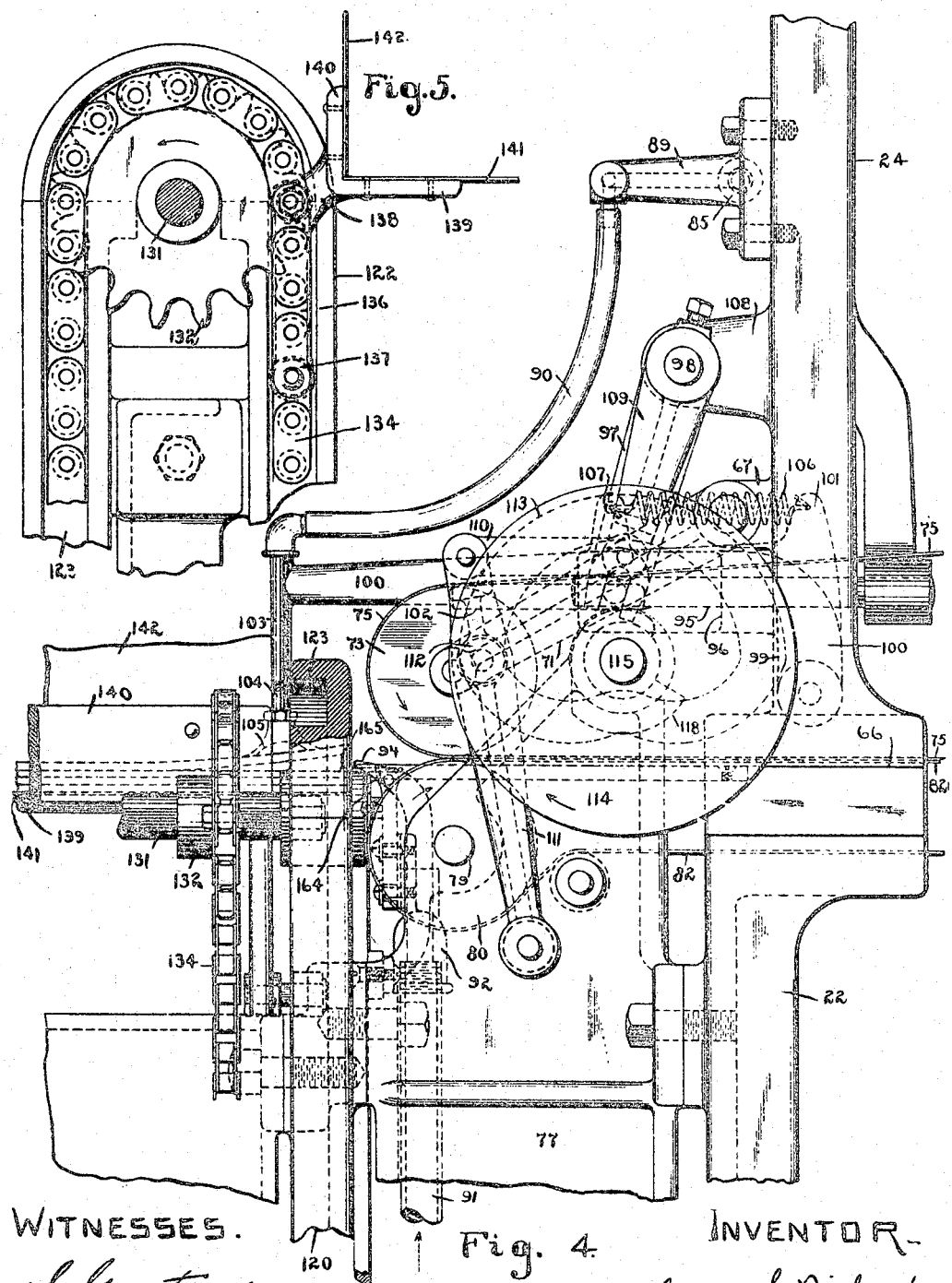
Figure 5:
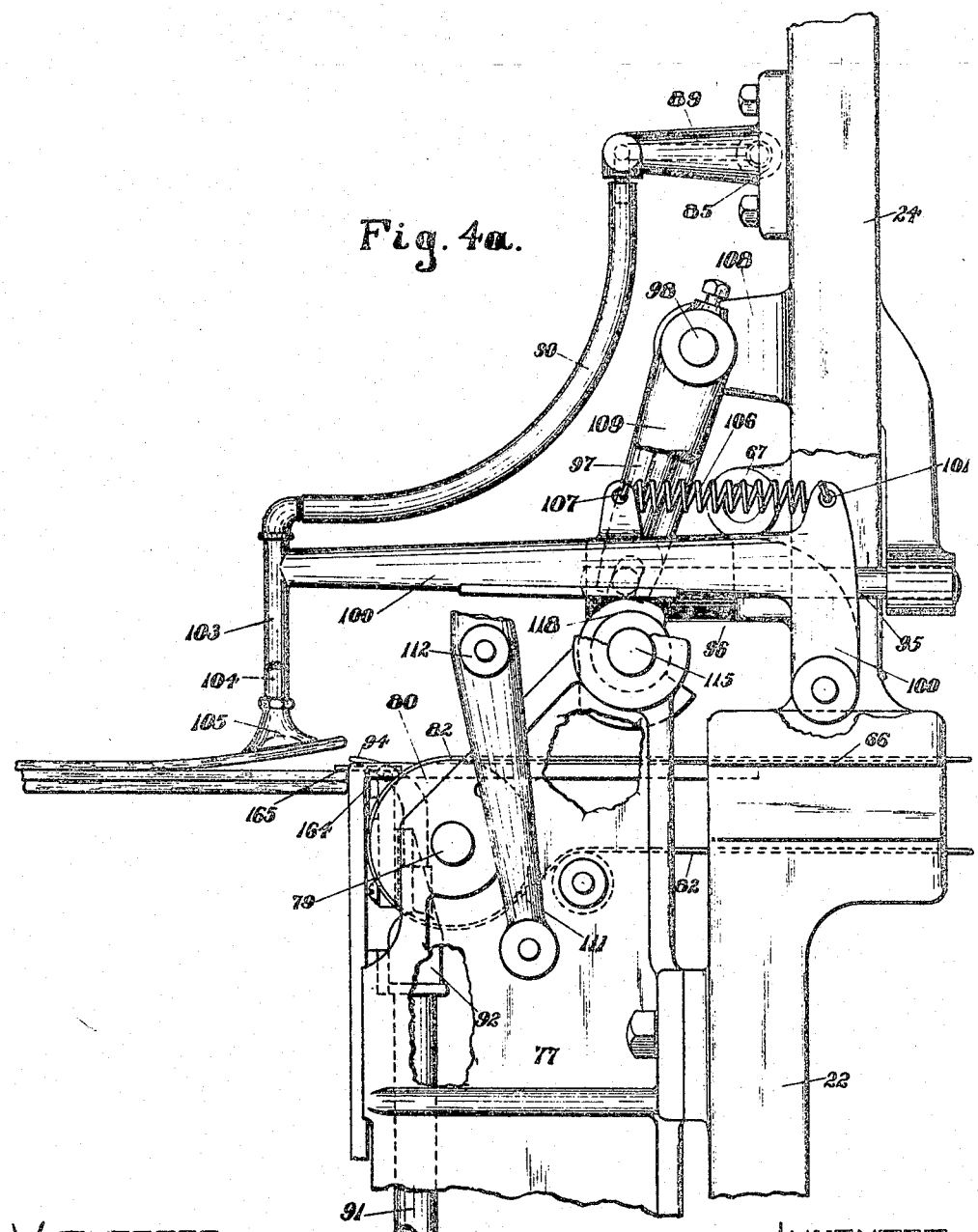
Figure 6:
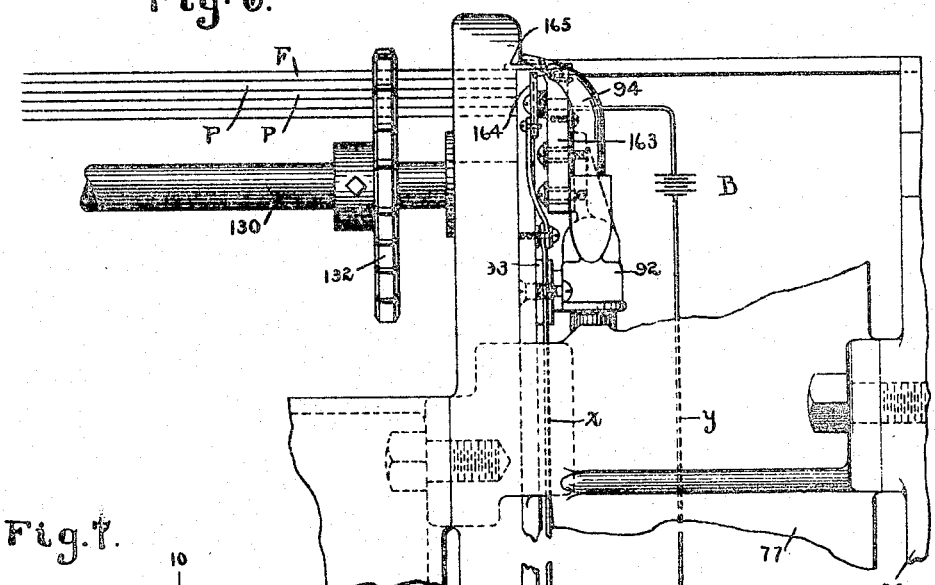
Figure 7:
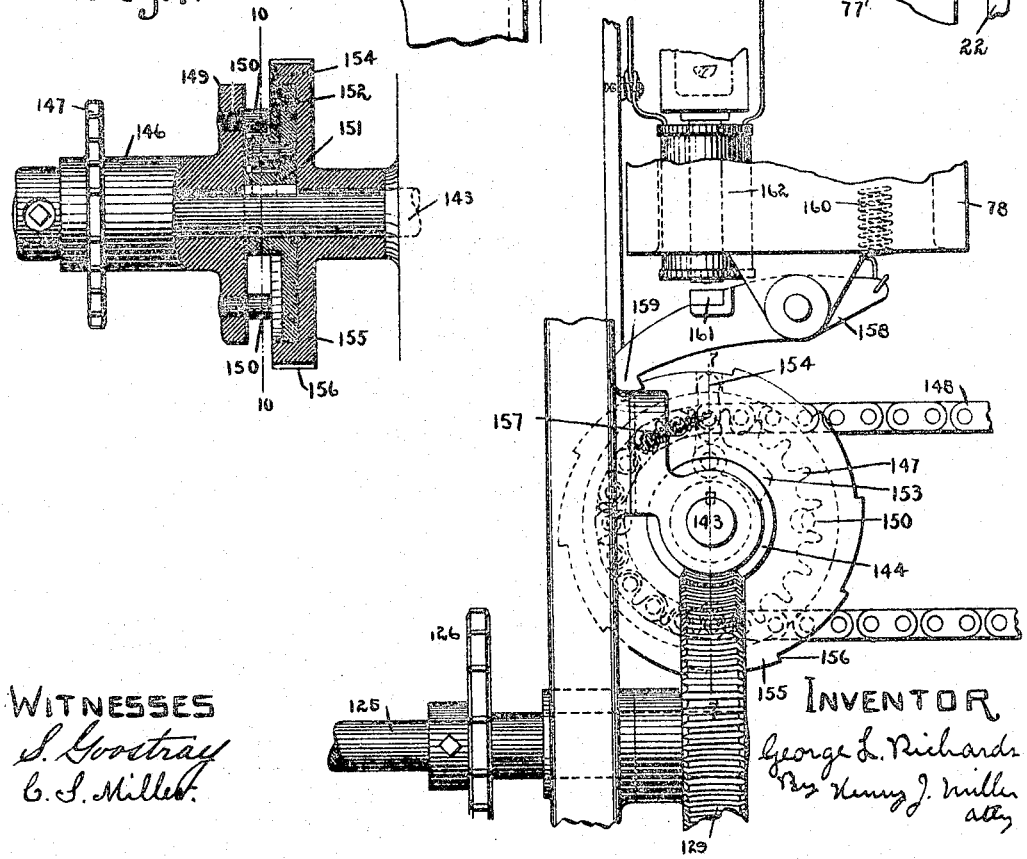
Figure 8:
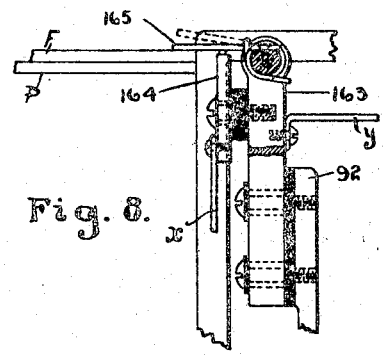
Figure 9:
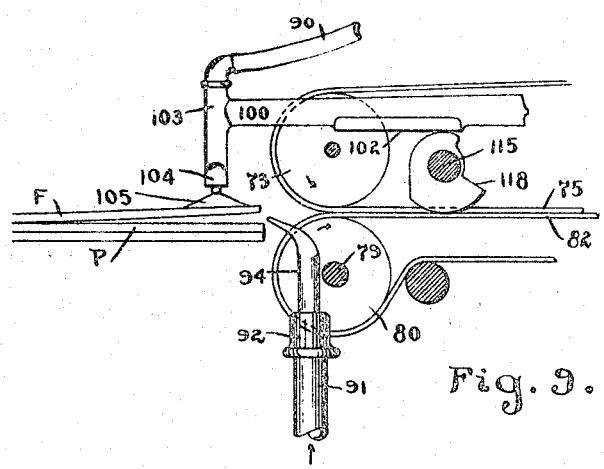
Figure 11:
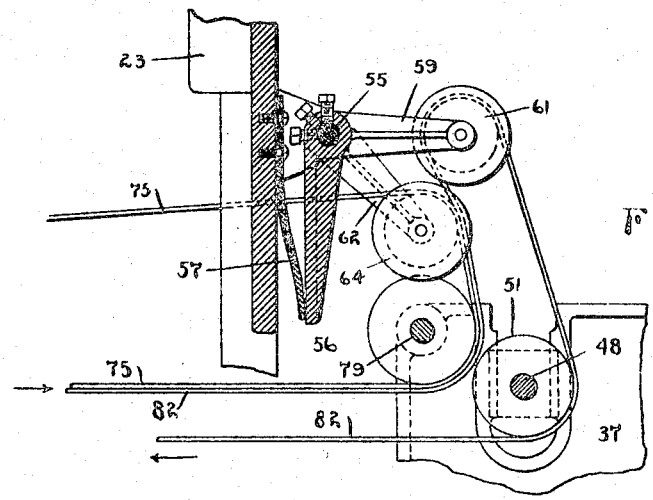
Figure 10:
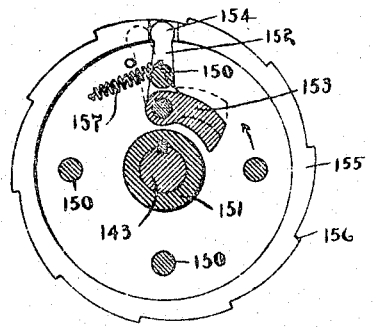

Figure 1, represents an end view of a machine for folding, wrapping, etc., newspapers, magazines, and other articles, looking at the elevator by means of which the newspapers, or similar articles, are fed upward to the path in which they are intended to be moved forward to the folding and wrapping, or other, mechanisms; the articles in this instance being represented by a series of parallel horizontal lines. Fig. 2, represents a side elevation of the same machine, the folding and wrapping mechanism being omitted as such mechanism forms no part of the present invention. Fig. 3, represents a plan view of the machine, particularly showing the shape of the elevator shelves and the position of the suction feeding-fingers with relation to the shelves and also showing the position of farthest backward movement of said fingers at the time they are depressed against the surface of the upper of a pile of the articles to be fed forward. Fig. 4, represents an enlarged side view of portions of the machine to illustrate the means for reciprocating the feeding arms and for elevating and depressing the same at the ends of their stroke, this figure also disclosing features of construction of the elevator mechanism. Fig. 4ª represents a detail side view of parts of the machine, some of the parts being removed. Fig. 5, represents a detail view of parts of the elevator mechanism. Fig. 6, represents a side elevation of parts of the machine to show the detector mechanism, the driving clutch, and the magnetically controlled detent for the clutch, together with the electrical connections between the detector and the magnet for said detent. Fig. 7, represents a vertical sectional view of the clutch for driving the elevator taken on a line 7—7 Fig. 6. Fig. 8, represents a detail view of the detector and its mounting. Fig. 9, represents a detail of the feeding forward of the magazine, etc., and showing the air blast directed between magazine which is being fed forward and the next succeeding magazine on the pile. Fig. 10, represents a sectional view of the clutch taken on line 10—10 Fig. 7. Fig. 11, represents a vertical sectional view of parts of the machine taken on line 11—11, Fig. 3. Fig. 12, represents an enlarged plan view of portions of the feeding in end of the machine.

Similar numbers of reference designate corresponding parts throughout.

Machines adapted to fold and wrap newspapers, magazines and other similar articles are, for practical purposes driven at a high rate of speed. The first fold of the paper by such machine is generally made by means of a blade which is brought against the central portion of the paper and forces the same between guides or into a narrow compartment, the end portions of the paper folding towards the blade as the central portion of such paper is thus forced into the guide. This folding blade is rapidly driven and, to insure the accurate folding of the paper, it is necessary to place the paper in exact position between the blade and the folding guide or guides before the edge of the blade is brought against the paper to make the first fold.

For the purposes of the present description the terms newspaper and magazine are designed to designate any plural number of sheets of paper which have received such preliminary securing together by folding or fastening that they may, under favorable conditions, be fed forward together, while they require additional folding to reduce them to a suitable size or shape for wrapping. It will therefore be seen that the problem to which attention is herein particularly directed is to the automatic rapid and accurate handling simultaneously of a plural number of sheets, for the feeding forward of the same and for the exact positioning of the same to receive the folding blade; and clearly distinguishing between such an article and an article comprising a single flat sheet of paper.

In the folding of a rectangular paper or magazine the first fold should be made on a line approximately parallel with the ends, for if the fold be made on a line angular to such ends no accurate wrapping of such paper is possible and it presents an objectional appearance. Much stress is therefore herein placed upon the accuracy of action in a machine for feeding forward newspapers, magazines, etc.

In order that the articles under consideration should be accurately and expeditiously fed forward it is important that their forward movement should not be resisted by the frictional contact, or weight, of adjacent similar articles and, for this reason the articles are preferably fed from the top of a pile of such articles.

As one of the newspapers, etc., is fed forward from the pile of such articles the height of said pile is diminished the thickness of the newspaper, etc., so fed forward and, as the automatic vertical adjustment, or compensation, of the mechanism for feeding forward the newspapers must be, in some degree limited, it is important that the pile of newspapers, etc., be elevated from time to time so that the top paper in such pile may be positioned in the path at which it is preferably engaged by the means which feeds it forward.

As shown in the drawings in its preferred form the machine is mounted on the base, or bed, 20 and is mainly supported by the frames 21 and 22 secured to such bed and having at their upper portions centrally disposed vertical guides 23 and 24 in which any ordinary folding blade 25 may move as is usual in machines of this character: provision being also made between these frames 21 and 22 for a space in which any additional folding and wrapping mechanism may be operatively located. The upper portions of the frames 21 and 22 being braced by the plates 26 and 27, having the curved edges 28 and 29, the slot 30 between such edges being designed to receive the paper when the same is forced downward by the action of the blade 25.

At the lower portion of the frame 21 are mounted journal bearings 31—31 in which the main drive shaft 32 is journaled, this shaft being supplied with the main pulley 33, to which power is applied in any manner to effect the rotation of the shaft, with the pump belt pulley 34 and with the sprockets 35 and 36.

From the frame 21 extend the brackets 37 and 38 and in these brackets are journaled the ends of the shaft 39 furnished with the sprocket 40 motion being transmitted from the sprocket 36 to this sprocket 40 by means of the chain 41 working on said sprockets; one reach of this chain also working in engagement with the teeth of the sprocket 42 on the shaft 43 which is journaled in a bearing in the bracket 38 and is provided with the gear 44 meshing with the idle gear 45, journaled on the shaft 46 extending from the bracket 38, and this latter gear 45 in turn meshing with the gear 47 on the shaft 48 which shaft is journaled in blocks 49 which work in guides in the brackets 37 and 38, this shaft 48 being provided with the sprocket 50, Fig. 2, and with the tape drive pulleys 51—51 and 52—52. In the brackets 37 and 38 is mounted the ends of the shaft 53 carrying rotatable tape guide pulleys as 54, Fig. 2, corresponding in number to the number of the pulleys 51 and 52.

Extending from the upper portion of the frame 21 are bearings in which is journaled the shaft 55 on the central part of which is adjustably clamped the lever arm 56 adapted to yieldingly limit the rocking motion of its shaft by contact with the intercepting spring 57 secured to the frame 23; on the shaft 55 are adjustably secured pairs of arms 58—58 and 59—59 respectively carrying rotatable tape guide pulleys 60—60 and 61—61, and adjacent to such arms are adjustably clamped, to said shaft, the arms 62—62, and 63—63 carrying the rotatable take up guide pulleys 64—64 and 65—65. On the frame 22, above the opening 66 in said frame, are the bearings 67—67 and 68—68 in which are rotatably mounted the respective shafts 69 and 70 each furnished with arms 71—71 and 72—72 carrying rotatable guide pulleys 73—73 and 74—74. Over the pulleys 73—73 work the feed tapes 75—75 which also work over the pulleys 54 and 65 near the frame 23 of the machine, likewise the feed tapes 76—76 work over the pulleys 74—74 and those marked 61—61 and 64—64.

Mounted on the frame 22 are the members 77 and 78 furnished with bearings in which the shaft 79 is mounted, this shaft being supplied with rotatable pulleys 80—80 and 81—81, carrying feed tapes 82—82 and 83—83 which also work over the related pulleys 51—51 and 52—52 and 60—60 and 61—61 and bear against the tapes 75—75 and 76—76 when working over the pulleys 54 and 65—65 and 64—64, the belts moving indicated by the arrows in Fig. 2.

On the base 20 is mounted a rotary pump 84 of any ordinary construction and having the exhaust pipe 85 and the pressure pipe 86: this pump being furnished with the pulley 87 which is driven by means of the belt 88 working over the periphery of the pump drive pulley 34 on the main drive shaft 32. The exhaust, or suction, pipe 85, extends upward and then alongside the upper portion of the frame 22 to connect with the rigid tubular arm 89 fixed to the guide 24 furnished with the depending flexible tubes 90. The pipe 86 has the upwardly extending portion 91 communicating with the air chamber 92 which is supported by the cross member 93 secured in the frame extensions 77 and 78 and having the outwardly bent nozzles 94—94 having flattened orifices.

Secured in perforations of the depending portion of the guide 24 are the guide rods 95—95 on which a carriage formed by the slides 96—96 is mounted to work under the impulses of the arm 97 mounted on the shaft 98 and pivotally connected with said slides 96—96; these slides have the downwardly extending end portions 99—99 to which are pivoted the levers 100—100 having the upward extensions 101—101, the ways 102—102 and the vertically disposed tubular portions 103—103 furnished with the tubular branches 104—104 each preferably provided with a plurality of suction cups 105—105 of rubber or other suitable material having elastic cushion edges, which cups communicate by means of the tubular portions 103 and 104 with the flexible tube 90 whereby, under action of the pump 84, air constantly flows into the cups 105 and through the communicating connections to the pump, being thence forced through the pipes 86 and 91 to the compartment 92 and thence out through the orifices in the air blast nozzles 94—94— for the purposes to be hereafter described. The upward extension of each arm 100 is connected by the spring 106 to the extension 107 of its related slide 96 which spring tends constantly to draw the extension 101 forward to swing its arm 100 downward.

The shaft 98 is journaled in bearings 108 and is rocked to swing the arm 97, and thus effect the reciprocation of the slides 96, by means of the arm 109 pivotally connected by the link 110 with the cam operated arm 111 which is pivotally mounted on the frame 77 and has the bearing 112 on which is adapted to work the cam path 113 of the cam 114, this cam being mounted on the shaft 115 which is journaled in bearings in the upper portions of the frames 77 and 78 and is provided with a sprocket 116 to which driving action is imparted by the chain 117 working over the said sprocket and over the sprocket marked 50 which is driven by the train of gears marked 47, 45, and 44.

The cam path 113 has a dwell, extending for approximately one half the rotation of the cam, and two quickly acting portions representing approximately the remaining one half of the rotation of said cam, whereby, as indicated in Fig. 4 of the drawing, a complete rotation of the shaft 115 and the cam 114 carries cam roll 112 rapidly towards the shaft 115, by reason of following the cam path 113, then rapidly moved back to the position indicated in said figure and, at this point, is permitted to rest while the dwell portion of the cam is moving over said bearing.

On the shaft 115 are mounted the cams 118—118 on the higher portions of which the ways 102—102 of the arms 100 ride when the slides 96—96 are reciprocated under the swinging of the arm 111 through the connections of the link 110, the arm 109, the shaft 98 and the arm 97, while, when the lower portions of said cams 118—118 are working beneath said way 102—102, the springs 106—106 are permitted to draw the extensions 101—101 of the arms 100—100 towards the extensions 107—107 of the slides 96—96, thus effecting the swinging of the arms 100—100 downward until the limit of action of the springs is reached or until the suction cups 105—105 are intercepted by some object, as by a newspaper or magazine.

Adjacent to the members 77 and 78 and preferably secured thereto are the elevator frames 119—120, and 121, 122, the pairs being suitably braced together and each having parallel vertical guide grooves 123—123 connected by curved grooves at the upper and lower ends of these frames. In bearings of the respective pairs of elevator frames are journaled the lower shafts 124 and 125 each furnished with a pair of sprockets 126 and 127 and with a gear 128 and 129, and the upper shafts 130—131 each provided with the sprockets 132 and 133 carrying sprocket chains 134 and 135.

At suitable intervals on the chains 134 and 135 are pivoted depending arms as 136, Fig. 5, provided at their lower portions with bearings 137, working in the grooves 123 of the respective elevator frames, and having above their pivots the outwardly extending portions 138 furnished with the angularly disposed plates 139 and 140 carrying shelves 141 and the side plates 142; the depending portions of the arms 137 act as levers below their pivots to resist the leverage of the shelves 141, these arms having their bearings 137 so positioned with relation to the distance from their pivots and with reference to the radius of the curved portions of the guide grooves 123 that the bearings 137 may readily travel in said groove. The shelves 141 are cut away as shown in Fig. 3 in order that they may pass by the feeding mechanism as the suction cups, 105.

Journaled in bearings on the elevator frames 120 and 122 is the clutch shaft 143 provided with the worm gears 144 and 145, meshing respectively with the gears 128 and 129 of the elevator shafts 124 and 125; on said shaft 143 is rotatable the clutch sleeve 146 having the sprocket 147 on which the chain 148 from the sprocket 35 works: this clutch sleeve having the laterally enlarged member 149 carrying the pins or bearings 150—150. Adjacent to the sleeve 146 and forming an abutment to receive the thrust of said sleeve is the clutch member 151 keyed to the shaft 143 and carrying the pivoted pawl 152 having the pin engaging member 153 and the actuating member 154, the free end of which works in a socket of the rim of the clutch case 155, rotatable on the shaft 143 and having the peripherally disposed teeth 156, a strain being constantly exerted on this actuating member 154 by the spring 157, connected with said member and with the clutch member 151, to swing the engaging member outward from the position indicated in dotted lines in Fig. 6 to carry the free end of said member into the path of the pins 150 on the constantly driven sleeve member 149, the engagement of one of said pins with said pawl member effecting the rotation of the member 151 and the shaft 143 to which said member is keyed, the clutch case 155 also rotating therewith as the end of the pawl arm 154 is engaged in the socket of said case.

When it is desired to release the clutch member 151 from driving connection with the sleeve 146 the rotation of the case 155 is resisted or prevented in any ordinary manner, with the result that the strain of the spring 157 is overcome by the positive engagement of the pawl arm 154 with the socket of said case while the clutch member 151 still rotates, thus effecting the swinging of the pawl on its pivot until the end of its member 153 is moved outside, towards the shaft 143, the path of the pins 150 thus disengaging the end of said pawl arms from the particular pin with which it has been engaged and permitting the sleeve 146 to rotate independently. If now the resistance to the movement of the clutch case 155 be removed, the spring 157 will act to draw the arm 154 of the pawl to effect the outward swinging of the pawl member 153 to bring the end thereof into the path of the pins 150, the case 155 being also caused to partially rotate by the action of said spring.

As the preferred means for interrupting the rotation of the clutch case 155 to effect the release of the shaft 143 from driving connection with the sleeve 146, thus controlling the driving of the elevators, the detent 158 is pivotally mounted on the frame member 78 to swing vertically above the case 155 and this detent has a tooth 159 adapted to engage one of the teeth or steps 156 of said case to interrupt the rotation thereof, the downward swinging of the toothed end of the detent being effected by the spring 160 mounted on the frame 78 and connected with the detent.

It is evident that the detent 158 may be controlled in any suitable manner from any desired movable part of the machine but, as the peripheral office of said detent is, in effect, to control feeding of groups, or piles, of newspapers or other articles vertically to a point from whence the topmost paper or article may be fed forward, it is preferred that the detent action should be controlled by the presence or non-presence of a paper, or article, at such point.

For the purpose of controlling this detent magnetically the detent is provided with the bar or plate 161 adapted to be attracted by the cores of the magnets 162 when such cores are magnetically excited by a current of electricity passing through the coils thereof. This magnet is supported on the frame 78 at a suitable distance above the detent and its coils are connected, by an electric circuit X—Y including the battery B or other source of electric energy, with the post 163 mounted on the air chamber 92, and insulated (electrically) therefrom, and with the electric contact 164 mounted on said post 163 and electrically insulated therefrom. On the post 163 is pivotally mounted the copper detector 165 adapted when released, to drop onto the contact 164 and thus complete the electric circuit through the magnet.

The detector 165 is sufficiently long to extend over the vertical path in which the papers are moved when on the elevator shelves but is not long enough to intercept the edges of the shelves when no papers are present, when, therefore the detector is sustained, as by the presence of a paper, out of contact with the contact 164 the electric circuit is interrupted and the detent rests in the position shown in Fig. 6 of the drawings, but if the circuit be completed, as by the detector 165 resting on the contact 164, the electric circuit will be completed, the bar 161 will be attracted by the energizing of the magnet cores and the clutch case 155 will be released, thus permitting the action of the spring 157 to swing the pawl to the engaging position as has been above described.

The elevator chains are arranged to be so driven by their connections with the shaft 143 that the elevator shelves are moved upward between the elevator frames, and downward at the outer sides of said frames, following the courses of the elevator chains over their sprockets.

If now power be applied to the pulley 33 by any suitable belt all the parts in driving connection therewith through the medium of chains, belts, or gear of any nature will be set in motion. The pump 84 will be driven to draw in air through the suction cups 105 of the feeding arms 100 and to expel the air through the blast nozzles 94.

The operation of the machine will best be understood by following a newspaper, magazine, etc., from the manual placing of the same on one of the shelves 141 of the elevator to the positioning of the papers, etc., against the stop 166—166 and under the springs 167—167 by which reverse movement of the paper is prevented, the side edge of the paper being at the same time guided by the guides 168—168 on the plate 26. The machine being in operation, a pile of newspapers, magazines, or other articles, is placed on a pair of the shelves 141—141 between the elevator stacks, the sides 142—142 protecting the end edges of the papers and guiding them when the papers are fed from the shelves. If the machine has been started without first supplying the shelves with papers, or if the top paper, marked F to distinguish it as the paper next to be fed forward from the other papers P—p, is below the path in which it is to be acted upon by the suction cups, 105 the detector 165 will rest on the contact 164 and the circuit being closed through the magnet 162 the detent 158 will be held out of engagement with the teeth 156 of the clutch case 155 and the shaft 143 will be driven from the sprocket 147 through the medium of the clutch connection, thus effecting the rotation of the worms 144—144 and of their related gears 128 to rotate the shaft on which said latter gears are mounted and to drive the elevator chains thus moving the shelves 141—141 upward between the elevator frames or stacks until the detector is intercepted and raised from the contact 164 when the electric circuit will be broken and the detent 158 will be released by the magnets and permitted to drop to a position where its tooth 159 may engage one of the teeth 156 of the clutch case to release the clutch as has above been described.

Particular attention is called to Figs. 1 and 4, where it is clearly shown that the detector 165 is positioned below the lateral path defined by the feed tapes 75 and 76 and 82—82 in passing over the plates 26 and 27 and below the orifices in the nozzles 94—94, hence when the top paper of a pile, moved upward by the elevator, engages said detector and lifts it from the contact 164, the elevator will stop with the uppermost paper of the pile approximately opposite the orifices in the nozzles 94—94 and with its upper surface slightly below the lateral path in which it is designed to be moved by the feed tapes 75—76 and 82—82.

One reason for stopping the elevator with the uppermost paper slightly below the path of the feed tapes is that the frictional contact between the paper being fed forward and the next paper below should be broken by the necessary lifting of the uppermost paper to carry its edge between the feed tapes. Another reason for so stopping the elevator and then lifting the uppermost paper is to admit air beneath said paper to break the suction between the two adjoining papers, whether such air be under ordinary atmospheric pressure or under the greater pressure supplied from the nozzles 94.

With the uppermost paper or magazine F in position to lift the detector 165, which is the position shown in Fig. 6 of the drawings, said paper F is also in position to receive the suction cups 105—105 when the ends of the arms 100 are depressed by the action of the springs 106. As the flexible edges of these cups adjust themselves on the surface of the paper to exclude air while the drawing action of the pump exhausts the air within the cups, the atmospheric pressure will effect such an intimate contact between the paper and the cups that the paper may be raised by the cups and carried forward.

When the suction cups 105 with the forward edge portion of the paper, etc., F are lifted, to bring the forward edge of the paper in the path in which it is fed forward, by the action of the cams 118 against the arms 100, the forward edge of the paper, preferably the bound edge, is raised above the orifices in the nozzles 94, so that the air issuing from said orifices, under pressure, passes between the lower surface of the uppermost paper F and the upper surface of the next paper P thereby effectually effecting the separation of the same and also tending to release the moving paper from the next lower paper and to overcome any tendency to create frictional magnetism as a result of drawing one paper over the other under circumstances which may arise. The air passing from the nozzles 94 also tends to lift the paper as it moves forward. The position now assumed by the paper, after its forward edge has been lifted is supposed to be approximately represented in Fig. 4 of the drawings, and the mechanism shown therein is now designed to carry the arm 111 forward by reason of its bearing 112 following the path of the cam 113; this, of course, effects the rocking of the shaft 98, by means of the link 110 and the arm 109, to swing the arm 97 and move the slides 95—95 forward, that is in the direction in which the paper is to be fed; this movement of the arms 100 carries forward the paper F until the front edge thereof is brought between the feed tapes 75—76 and 82—82 as such tapes pass around the pulleys 73 and 80, the pulleys 73 being permitted to yield somewhat, at this time, by reason of their arms being pivoted. As the forward edge of the paper F is engaged between the feed tapes the forward movement of the arms 100 ceases and they are now moved backward, the frictional engagement of the feed tapes with the paper and the forward impetus given thereto, by the tapes being more rapidly driven than are the arms 100, being sufficient to release the paper from the suction of the cups 105. The paper is now fed along between the tapes until it is intercepted by the stop 166 and is held by the spring 167 in position to be forced through the opening between the plates 26 and 27 by the downward movement of any suitable folding blade.

As the edge of the uppermost paper is moved upward from the pile of papers the detector 165 swings upward on its pivot until the edge of the paper clears the end of the detector 165, the detector then falling back onto the upper surface of the next paper of the pile, if such surface is above the end of the contact 164; if such surface of the, now, uppermost paper of the pile is below said contact, that is below the point at which it should be for the feeding forward, then the detector strikes the contact in falling and effects the closing of the electric circuit to release the detent and permit the operation of the clutch.

I have expressly used the terms newspapers, magazines, and other objects as including any article or objects which this machine in its preferred form or in any equivalent thereof is capable of feeding.

I do not desire to limit myself to the specific construction herein shown and described, for I understand that the same may be considerably modified without departing from the spirit of my invention, for instance, the means for elevating the pile of papers may be changed, or the means for feeding the papers from the elevator; mechanical means may also be used for controlling the driving of the elevator from the detector or its equivalent, and other changes may be made.

Having thus described my invention, I claim as new and desire to secure by Letters Patent,

1. A machine for feeding off newspapers, etc., from piles comprising upper and lower series of frictional feeding devices one of which is mounted to yield at the engaging point, and is frictionally driven, a carriage mounted to slide, means for reciprocating said carriage, feeding arms pivotally mounted on the carriage, cams on which said arms ride during the reciprocation of the carriage, said cams being shaped to permit the depression of said arms.

2. A machine for feeding off newspapers, etc.; from piles comprising a carriage mounted to slide, means for reciprocating said carriage, feed arms pivoted to the carriage, cams on which the arms ride during the movement of the carriage, means for rotating the cams, said cams being shaped to permit the depression of the arms only at the retracted position of the carriage and to move said arms upward before the forward movement of the carriage, upper and lower series of frictional feeding means defining a path of movement below the path in which said carriage slides, the upper of said frictional feeding means being yieldingly mounted and frictionally driven.

3. A machine for feeding off newspapers, etc.; from piles comprising upper and lower feed tapes the upper of which is frictionally driven, defining a lateral path, a carriage mounted to slide above said path, arms pivotally mounted on the carriage and having suction cups, spring means for exerting a strain on said arms to move the free ends of the same downward, rotatable cams adapted to support the arms against said springs during the movement of the carriage and at times to permit the springs to act, and means for moving the carriage.

4. A machine for feeding off newspapers, etc., from piles comprising upper and lower series of feed tapes the upper series of which is yieldingly mounted and is frictionally driven by contact with the lower series, means for moving a pile of newspapers, etc., vertically, including a clutch connection adapted to be released by resisting the movement of a rotatable member thereof, an electrical circuit including a circuit breaker positioned to intercept said papers and a magnet, and a detent, for said rotatable clutch, pivotally mounted and adapted to be attracted by said magnet when the circuit is closed, an air blast located slightly above said circuit breaker, and a carriage mounted to slide above the level of said circuit breaker and provided with depressible arms furnished with mouth pieces forming air inlets as described.

In testimony whereof I affix my signature in presence of two witnesses.

GEORGE L. RICHARDS.

Witnesses:
S. GOOSTRAY,
H. J. MILLER.

Correction in Letters Patent No. 900,782.

It is hereby certified that the name of the assignee in Letters Patent No. 900,782, granted October 13, 1908, upon the application of George L. Richards, of Brookline, Massachusetts, for an improvement in "Machines for Feeding Off Newspapers," was erroneously written and printed "Neilsen Mailing Machinery Company," whereas the said name should have been written and printed *Nielsen Mailing Machinery Company*, and that the said Letters Patent should be read with this correction therein that the same may conform to the record of the case in the Patent Office.

Signed and sealed this 10th day of November, A. D., 1908.

[SEAL.]

C. C. BILLINGS,
*Acting Commissioner of Patents.*